United States Patent Office 3,637,783
Patented Jan. 25, 1972

3,637,783
COMPOSITION AND PROCESS FOR PREPARING FLEXIBLE POLYESTER BASED POLYURETHANE FOAMS
Loren A. Haluska, c/o Dow Corning Corp., Midland, Mich. 48640
No Drawing. Filed Sept. 25, 1968, Ser. No. 762,612
Int. Cl. C07f 7/08
U.S. Cl. 260—448.2 B                           8 Claims

ABSTRACT OF THE DISCLOSURE

A composition is disclosed which consists essentially of a mixture of trimethylsilyl endblocked methylpolyoxyethylene siloxanes which composition is useful in the preparation of flexible polyester based polyurethane foams. Use of this composition minimizes problems of splitting and shrinkage of the foams, promotes uniformity of cell size, promotes compatibility of the reactants and catalyst, and allows wider processing and formulation latitude.

---

The preparation of polyester based polyurethane foams is described in numerous places in the literature. Reference may be had, for example, to U.S. Pat. Re. 24,514, the disclosure of which is incorporated herein by reference, for a disclosure of specific examples of the basic components for preparing such a foam and a processing technique for preparing the foam.

It has become the practice to employ a "surfactant" in the preparation of polyurethane foams which is added for the purpose of controlling the cell size and/or stabilizing the foam. However, with the heretofore available surfactants uniformity and reproducibility of cell size are still a problem. Other problems frequently encountered include splitting and shrinkage of the foam; failure of the foam to rise uniformly; and narrow operation and formulation latitude.

It has now been unexpectedly discovered that when a particular composition unknown heretofore is employed as a surfactant in the preparation of polyester based polyurethane foams the foregoing problems can be overcome or substantially minimized.

More specifically, this invention relates to a composition which consists essentially of a mixture of trimethylsilyl endblocked methyl-polyoxyethylene siloxanes of the general formula

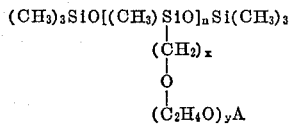

wherein
$n$ has a value of from 1 to 8,
$x$ has an average value of from 2 to 12,
$y$ has an average value of from 8 to 60, and
A is a capping group.

This invention further relates to an improvement in a process of preparing a flexible polyester based polyurethane foam wherein a surfactant is used to control cell size and/or stabilize the foam, the improvement comprising employing as the surfactant the composition as defined above.

The methyl-polyoxyethylene siloxane compositions employed in the process of this invention can be prepared by the well-known process of adding a terminally unsaturated polyoxyethylene glycol to the appropriate Si-H containing siloxane mixture in the presence of a suitable catalyst such as chloroplatinic acid. The preparation is illustrated by the following equation:

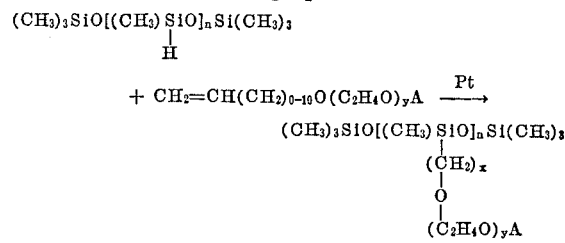

As should be apparent from the above formula, the operable polyoxyethylene siloxanes are those mixtures which are trimethylsilyl endblocked and contain from 1 to 8 methylpolyoxyethylene siloxane units in the chain. One particularly preferred mixture is composed of 50 to 75 mol percent of trimer species ($n=1$) and 25 to 50 mol percent of tetramer species ($n=2$).

It is important to note that the siloxanes contain no dimethylsiloxane units in the chain. The introduction of such units, especially in increasing amounts, has a deleterious effect on polyester polyurethane foam preparation.

The polyoxyethylene portion of the molecule is attached to the silicon atom via an alkylene bridge, usually a polymethylene bridge, as can readily be seen from the above formula. This alkylene bridge can contain, on an average, from 2 to 12 carbon atoms, that is to say, $x$ has an average value of from 2 to 12.

On the average, there are from 8 to 60 of the polyoxyethylene units in the siloxanes useful in the above composition. That is, $y$ has an average value of from 8 to 60.

The polyoxyethylene unit is terminated or capped by the A group. Thus the polyoxyethylene unit can be capped by a hydroxyl group (A is a hydrogen atom), by an ether group (A is a monovalent hydrocarbon radical such as a methyl, butyl, vinyl or phenyl radical), by a carboxyl radical, by the salt or ester of a carboxyl radical, or a carbonate ester group. The preferred embodiment is when A is a hydrogen atom. The other preferred embodiment is prepared by reacting a copolymer wherein A is a hydrogen atom with the cyclic anhydride of a carboxylic acid. A salt of the resulting terminal carboxylic group can then be prepared if so desired. It should be noted at this time that when a salt of a carboxylic or carboxyl radical is referred to herein it is intended to include the amine salts as well as the salts of alkali and alkaline earth metal oxides and hydroxides.

The amount of the above composition employed in preparing a polyester based polyurethane foam will vary depending on the exact characteristics desired in the final product, the specific process and formulation used, and individual preferences. Generally speaking, however, the amount of the composition employed should be within the range of 0.1 to 2.0 (preferably 0.5 to 1.0) percent based on the total weight of the polyurethane foam composition.

Now in order that those skilled in the art may better understand how the present invention can be practiced, the following examples are given by way of illustration and not by way of limitation.

All parts and percents referred to herein are on a weight basis, and all viscosities measured at 25° C. unless otherwise specified.

EXAMPLE 1

Into a 1-liter, 3-necked flask equipped with reflux condenser, thermometer and stirrer, there was placed 64 g. of $$(CH_3)_3SiO[(CH_3)\underset{H}{Si}O]Si(CH_3)_3,$$

36 g. of $$(CH_3)_3SiO[(CH_3)\underset{H}{Si}O]_2Si(CH_3)_3$$

and 405.3 g. of the glycol $CH_2=CHCH_2O(C_2H_4O)\sim_{12}H$. This mixture was heated to 90° C. and then 0.6 cc. of a solution of chloroplatinic acid in isopropanol (containing 2% Pt) was added and the mixture exothermed to about 134° C. An analysis showed virtually no SiH present in the mixture so it was stripped to 150° C. at 6.1 mm. of mercury pressure, then cooled and filtered to obtain 502.8 g. of a composition which consisted essentially of about 70 mol percent of $$(CH_3)_3SiO[(CH_3)\underset{\underset{\underset{(C_2H_4O)\sim_{12}H}{|}}{\underset{O}{|}}}{\underset{(CH_2)_3}{|}}SiO]Si(CH_3)_3 \text{ end}$$

and 30 mol percent of $$(CH_3)_3SiO[(CH_3)\underset{\underset{\underset{(C_2H_4O)\sim_{12}H}{|}}{\underset{O}{|}}}{\underset{(CH_2)_3}{|}}SiO]_2Si(CH_3)_3$$

The composition had a viscosity of 174 cs., a specific gravity of 1.063 and a refractive index of 1.4562.

EXAMPLE 2

In a flask equipped as in Example 1 there was placed 111.3 g. of $$(CH_3)_3SiO[(CH_3)\underset{H}{Si}O]_{1-8}Si(CH_3)_3$$

and 431.3 g. of the glycol $CH_2=CHCH_2O(C_2H_4)\sim_{12}H$. This mixture was heated to 90° C. and then 1 cc. of a solution of chloroplatinic acid in isopropanol (containing 2% Pt) was added and the mixture exothermed to about 122° C. An analysis showed virtually no SiH present in the mixture so it was stripped to 150° C. at 8.8 mm. of mercury pressure, then cooled and filtered to obtain 507 g. of a composition which consisted essentially of $$(CH_3)_3SiO[(CH_3)\underset{\underset{\underset{(C_2H_4O)\sim_{12}H}{|}}{\underset{O}{|}}}{\underset{(CH_2)_3}{|}}SiO]_{1-8}Si(CH_3)_3$$

The composition had a viscosity of 172 cs., a specific gravity of 1.080 and a refractive index of 1.4602.

EXAMPLE 3

To a 416.7 g. of a composition consisting essentially of about 70 mole percent of $$(CH_3)_3SiO[(CH_3(Si)O]Si(CH_3)_3 \atop \underset{\underset{(C_2H_4O)\sim_{12}H}{|}}{\underset{\underset{O}{|}}{\underset{(CH_2)_3}{|}}}}$$

and about 30 mole percent $$(CH_3)_3SiO[(CH_3)SiO]_2Si(CH_3)_3 \atop \underset{\underset{(C_2H_4O)\sim_{12}}{|}}{\underset{\underset{O}{|}}{\underset{(CH_2)_3}{|}}}}$$

there was added 50.4 g. of succinic anhydride and then the resulting mixture was heated in the range of 120°–140° C. for 4 hours. The mixture was then cooled and filtered to obtain an essentially quantitative yield of a composition as above except that the siloxanes therein now had the following respective formulae.

$$(CH_3)_3SiO[(CH_3)SiO]Si(CH_3)_3 \atop \underset{\underset{(C_2H_4O)\sim_{12}-\overset{O}{\overset{||}{C}}(CH_2)_2COOH}{|}}{\underset{\underset{O}{|}}{\underset{(CH_2)_3}{|}}}}$$

and $$(CH_3)_3SiO[(CH_3)SiO]_2Si(CH_3)_3 \atop \underset{\underset{(C_2H_4O)\sim_{12}-\overset{O}{\overset{||}{C}}(CH_2)_2COOH}{|}}{\underset{\underset{O}{|}}{\underset{(CH_2)_3}{|}}}}$$

The product had a viscosity of 431 cs., a specific gravity of 1.090, a refractive index of 1.4569 and a neutral equivalent of 918.

EXAMPLE 4

A polyester based polyurethane foam was prepared by mixing 100 parts of a commercial glycol-adipate polyester resin, 4 parts of water, 2 parts of N-ethyl morpholine, 0.2 part of N,N-dimethyl cetyl amine and 1 part of a composition consisting essentially of about 62 mol percent $$(CH_3)_3SiO[(CH_3)SiO]Si(CH_3)_3 \text{ end} \atop \underset{\underset{(C_2H_4O)\sim_{12}H}{|}}{\underset{\underset{O}{|}}{\underset{(CH_2)_3}{|}}}}$$

and about 38 mol percent $$(CH_3)_3SiO[(CH_3)SiO]_2Si(CH_3) \atop \underset{\underset{(C_2H_4O)\sim_{12}H}{|}}{\underset{\underset{O}{|}}{\underset{(CH_2)_3}{|}}}}$$

for about 30 seconds at 1200 r.p.m., then adding toluene diisocyanate (80/20 ratio of the 2,4 and 2,6 isomers) in 3% excess (103 Index) and mixing for about 7 seconds at 1000 r.p.m., allowing the foam to rise completely, and then air cure. This foam had a rise time of about 74 seconds. It had a breathability of about 0.4 cubic feet per minute. "Breathability" is a measure of the number of open cells in a foam and is the amount of air that can be drawn through a 1½″ x 1½″ x 1″ specimen of the foam at a pressure head of 1″ of water. The air is drawn through the 1″ thickness of the foam, the air flow being parallel to the direction of the foam rise.

EXAMPLE 5

When the compositions of Examples 1–3 or the following trimethylsilyl endblocked methyl-polyoxyethylene siloxane compositions are substituted for the composition of Example 4, polyester based polyurethane foams are obtained with minimal problems of splitting and shrinkage and they have uniform cells.

(A) $(CH_3)_3SiO[(CH_3)SiO]_{1-3}Si(CH_3)_3 \atop \underset{\underset{(C_2H_4O)\sim_{12}H}{|}}{\underset{\underset{O}{|}}{\underset{(CH_2)_3}{|}}}}$ (B) $(CH_3)_3SiO[(CH_3)SiO]_{1-8}Si(CH_3)_3 \atop \underset{\underset{(C_2H_4O)_{10}H}{|}}{\underset{\underset{}{}}{\underset{(CH_2)_{11}}{|}}}}$ (C) $(CH_3)_3SiO[(CH_3)SiO]_{1-2}Si(CH_3)_3 \atop \underset{\underset{(C_2H_4O)_8C_4H_9}{|}}{\underset{\underset{O}{|}}{\underset{(CH_2)_3}{|}}}}$ (D) $(CH_3)_3SiO[(CH_3)SiO]_{1-8}Si(CH_3)_3$
  |
  $(CH_2)_3$
  |
  O
  |
  $(C_2H_4O)_{30}C_6H_5$ (E) $(CH_3)_3SiO[(CH_3)SiO]_{1-8}Si(CH_3)_3$
  |
  $(CH_2)_6$
  |
  O
  |
  $(C_2H_4O)_{60}$—C(=O)—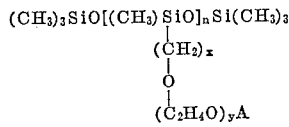
  COOH (F) $(CH_3)SiO[(CH_2)SiO]_{1-2}Si(CH_3)_3$
  |
  $(CH_2)_3$
  |
  O
  |
  $(C_2H_4O)_{11}$—C(=O)—O—$C_6H_5$ L (G) $(CH_3)_3SiO[(CH_3)SiO]_{1-2}Si(CH_3)_3$
  |
  $(CH_2)_3$
  |
  O
  |
  $(C_2H_4O)_{14}$—CN—(ring with $CH_3$ and NCO)

(H) $(CH_3)_3SiO[(CH_3)SiO]_{1-2}Si(CH_3)_3$
  |
  $(CH_2)_{3-5}$
  |
  O
  |
  $(C_2H_4O)_{8-16}$—C(=O)$(CH_2)_2$COOH (I) $(CH_3)_3SiO[(CH_3)SiO]_{1-8}Si(CH_3)_3$
  |
  $(CH_2)_3$
  |
  O
  |
  $(C_2H_4O)_{12}$—C(=O)$CH_3$

That which is claimed is:

1. A composition which consists essentially of a mixture of trimethylsilyl endblocked methyl-polyoxyethylene siloxanes of the general formula $(CH_3)_3SiO[(CH_3)SiO]_nSi(CH_3)_3$
  |
  $(CH_2)_x$
  |
  O
  |
  $(C_2H_4O)_yA$ wherein
$n$ has a value of from 1 to 8,
$x$ has an average value of from 2 to 12,
$y$ has an average value of from 8 to 60, and
A is a capping group.

2. The composition as defined in claim 1 wherein $x$ has an average value of from 3 to 5, and $y$ has an average value of from 8 to 16.

3. The composition as defined in claim 2 wherein $n$ has a value of from 1 to 2, $x$ has an average value of 3, $y$ has an average value of about 12, and A is a hydrogen atom.

4. The composition as defined in claim 3 wherein 50 to 75 mol percent of the mixture is the species wherein $n$ is 1, and 25 to 50 mol percent of the mixture is the species wherein $n$ is 2, and $x$ is 3.

5. A composition which consists essentially of a mixture of trimethylsilyl endblocked methyl-polyoxyethylene siloxanes of the general formula

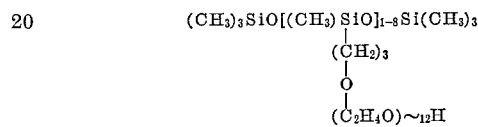

6. The composition as defined in claim 1 wherein A is a carboxyl containing radical.

7. The composition as defined in claim 2 wherein A is a carboxyl containing radical.

8. The composition as defined in claim 2 wherein $n$ has a value of from 1 to 2, $x$ has an average value of 3, $y$ has an average value of about 12, and A is a carboxyl containing radical.

References Cited

UNITED STATES PATENTS

| | | | |
|---|---|---|---|
| 3,182,076 | 5/1965 | Holdstock | 260—448.2 B |
| 3,341,338 | 9/1967 | Pater | 260—448.2 X |
| 3,342,766 | 9/1967 | Huntington | 260—448.2 X |
| 3,398,104 | 8/1968 | Haluska | 260—448.2 X |
| 3,427,271 | 2/1969 | McKellar | 260—448.2 X |
| 3,457,173 | 7/1969 | Pater | 260—448.2 X |

TOBIAS E. LEVOW, Primary Examiner

P. F. SHAVER, Assistant Examiner

U.S. Cl. X.R.

260—2.5 AM; 252—351, 356; 260—2.5